United States Patent
Morrison

(10) Patent No.: US 10,338,371 B1
(45) Date of Patent: Jul. 2, 2019

(54) SPACE TELESCOPE WITH BEAM STEERING OBJECTIVE

(71) Applicant: Glenn Arthur Morrison, Momence, IL (US)

(72) Inventor: Glenn Arthur Morrison, Momence, IL (US)

(*) Notice: Subject to any disclaimer, the term of this patent is extended or adjusted under 35 U.S.C. 154(b) by 0 days.

(21) Appl. No.: 16/024,631

(22) Filed: Jun. 29, 2018

(51) Int. Cl.
G02B 23/06 (2006.01)
G02B 23/00 (2006.01)

(52) U.S. Cl.
CPC .............. G02B 23/06 (2013.01); *G02B 23/00* (2013.01); *G02B 2207/117* (2013.01)

(58) Field of Classification Search
CPC ................ G02B 2207/117; G02B 23/00–26
USPC .......................................... 359/363, 399–431
See application file for complete search history.

(56) References Cited

U.S. PATENT DOCUMENTS

| | | | |
|---|---|---|---|
| 6,219,185 B1 | 4/2001 | Hyde | |
| 6,999,226 B2 | 2/2006 | Kim et al. | |
| 7,798,648 B2 | 9/2010 | Ijzerman et al. | |
| 7,828,451 B2 | 11/2010 | Cash | |
| 8,480,241 B1 | 7/2013 | Tenerelli et al. | |
| 2008/0212217 A1 | 9/2008 | Robert | |
| 2009/0153938 A1 | 6/2009 | Arenberg et al. | |

FOREIGN PATENT DOCUMENTS

JP  22-2010091658  4/2010

OTHER PUBLICATIONS

Laine, D. 'Transmissive, Non-imaging Fresnel types of Reflective Radiation Concentrators Revisited' Optics and Laser Technology vol. 54 Dec. 2013, p. 274.

*Primary Examiner* — Kristina M Deherrera

(57) ABSTRACT

Disclosed is an entirely reflective space telescope featuring a segmented primary objective, simulating a refractive Fresnel lens, providing high optical efficiency over a wide spectral range. Each nonfocusing objective segment is all-reflective, having v-shaped mirrored elements for steering a portion of the incident light beam to a secondary focusing module, where an unobstructed wide angle secondary mirror focuses each segment's beam onto a dedicated mirror segment of an optical path corrector. This corrects path length errors, steers and focuses the beams, equally timed and in phase, to an image sensor. A sparsely segmented objective gives larger apertures. For greater apertures, a sparse primary objective and fully tiled secondary relay objective are combined with fully tiled and sparse optical path correctors. A flotilla of fully tiled segmented telescopes can support either amplitude-phase or intensity interferometry. Coronagraphs and starshade occluders can be included to reduce diffraction noise from bright sources.

14 Claims, 11 Drawing Sheets

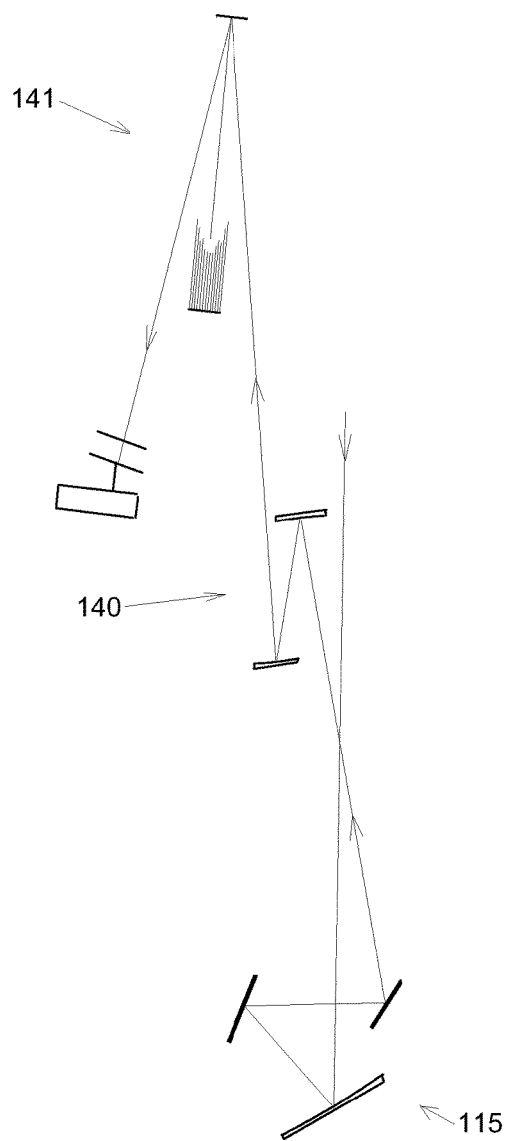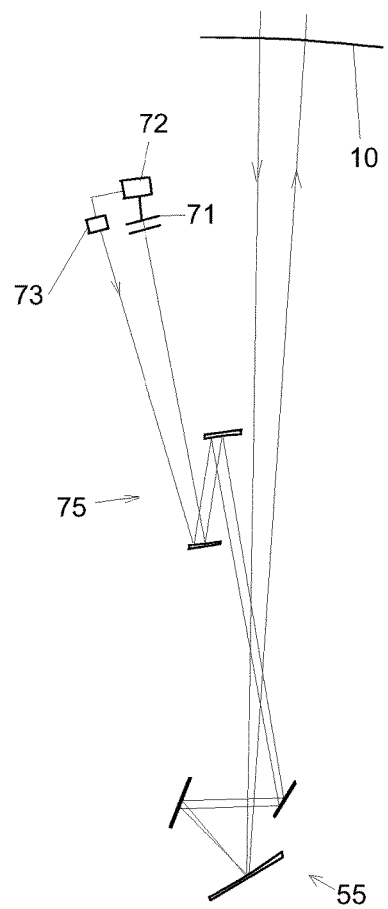
Fig. 13
Fig. 14

SPACE TELESCOPE WITH BEAM STEERING OBJECTIVE

BACKGROUND

Space telescopes such as the Hubble and James Webb have either continuous or segmented mirrors as primary objectives, arranged in a Ritchey-Chretien-Cassegrain, a three mirror anastigmat Korsch, or similar system. As space telescopes become larger, certain disadvantages become apparent. Mass, and cost, increase at a rate between the square and cube of the aperture. The requirement for precision of segment fabrication, and precision of location and angular orientation of the mirror segments becomes more difficult to meet. A conventional telescope places heavy reliance on the objective to focus the incident beam to an image, requiring severe design constraints.

A type of large telescope that has been proposed to address some of these concerns is the diffractive, in which a thin diffractive phase controlling objective focuses light to an image sensor or to an inverse diffractive secondary focuser to form an image. An example is the Eyeglass concept (U.S. Pat. No. 6,219,185 Hyde). This type of instrument involves a lightweight objective made from large numbers of diffractive glass panels, deployed as origami-folded, which can handle about a factor 3 variation in wavelength without excessive loss of light transmitting capacity. Other examples of the diffractive type are Nautilus (University of Arizona College of Optical Sciences), the Koechlin Fresnel Imager, and Moire (DARPA), involving thin diffractive membrane objectives, with similar limitations on spectral bandwidth. Also of interest is the Cash Aragoscope, which diffracts light around the rim of an occluder disk, imaging at the optical axis mainly bright extended sources such as star surfaces. This device has wide spectral range and high resolution but low sensitivity.

In a different category the Labeyrie "hypertelescope" consists of a flotilla of independent mirror spacecraft that focus incident beams to an image sensor. In some Labeyrie versions, a single large mirror is formed from small reflective particles trapped along a parabolic surface by standing waves produced by a laser. Here, problems may arise from disturbing influences such as sunlight and electrostatic charges accumulated from solar wind. In versions involving the Hanbury Brown and Twiss intensity interferometry technique, a flotilla of independent telescopes is deployed, all aimed at the same distant object and measuring in real time the variation of light intensity from that object. The intensity information is sent to a central computer which uses an algorithm to construct an image.

In the present device there is a division of labor. Three components: the objective, a secondary mirror and an optical path corrector all share the work of focusing, reducing the design burden on each component. The present device offers the advantage of greatly reducing the mass of components to be transported to space. It also greatly increases the tolerances for error in placement and orientation of the segments of the objective. Another advantage is a wide field of view, comparable to refractors. The optical train is totally reflective throughout, the light not passing through any optical materials on its path to the image plane. Consequently, the most prominent advantage of the present device is a very wide spectral range from near UV to mid infrared, with high transmission efficiency throughout the range. The resulting versatility is of paramount importance for astronomy even more than for Earth observation.

BRIEF SUMMARY

In the present invention, the main advantage is to provide a large lightweight transmissive-reflective space telescope with high tolerance for location and angular positioning of the objective components, while at the same time providing a large spectral range or 100 to 1 or more, highly preferred for astronomy. A further advantage is reduced image aberrations, both on and off axis, compared to other types of objectives.

In an embodiment, a non focusing (steering) transmissive-reflective multi-segment tiled objective directs incident light beams to a secondary mirror which focuses an image of the objective and its segments onto a multi-segmented optical path corrector. In turn, the corrector focuses an image of the distant object onto an image sensor.

In another embodiment, a large sparse objective directs its beams through a sparse two component optical path corrector, to accommodate greater variations in path lengths. The beams are then focused to an image sensor.

Another embodiment, combining the above two embodiments, allows increased aperture without a large increase in mass. A large sparse objective directs light to a tiled relay objective, and in turn to a secondary mirror, a tiled path corrector, a sparse path corrector, and to an image sensor.

In a further embodiment a large sparse low f-number primary objective flotilla consisting of tiled high f-number retro-reflectors, arranged along a parabolic surface, directs beams to a tiled relay objective, to an array of secondary mirrors and to an image sensor.

Another embodiment involves intensity interferometry for extremely large apertures. In a sparse flotilla of tiled telescopes, each telescope forms an image as in the other embodiments. The intensity of image pixels modulates laser beams sent to a central computer which constructs a high resolution image.

BRIEF DESCRIPTION OF DRAWINGS

FIG. 13: Cross section: apodizing two stage secondary focusing module.

FIG. 14: Schematic cross section: flotilla telescope for intensity interferometry.

DETAILED DESCRIPTION

First Embodiment: Fully Tiled Objective

Figure 1:
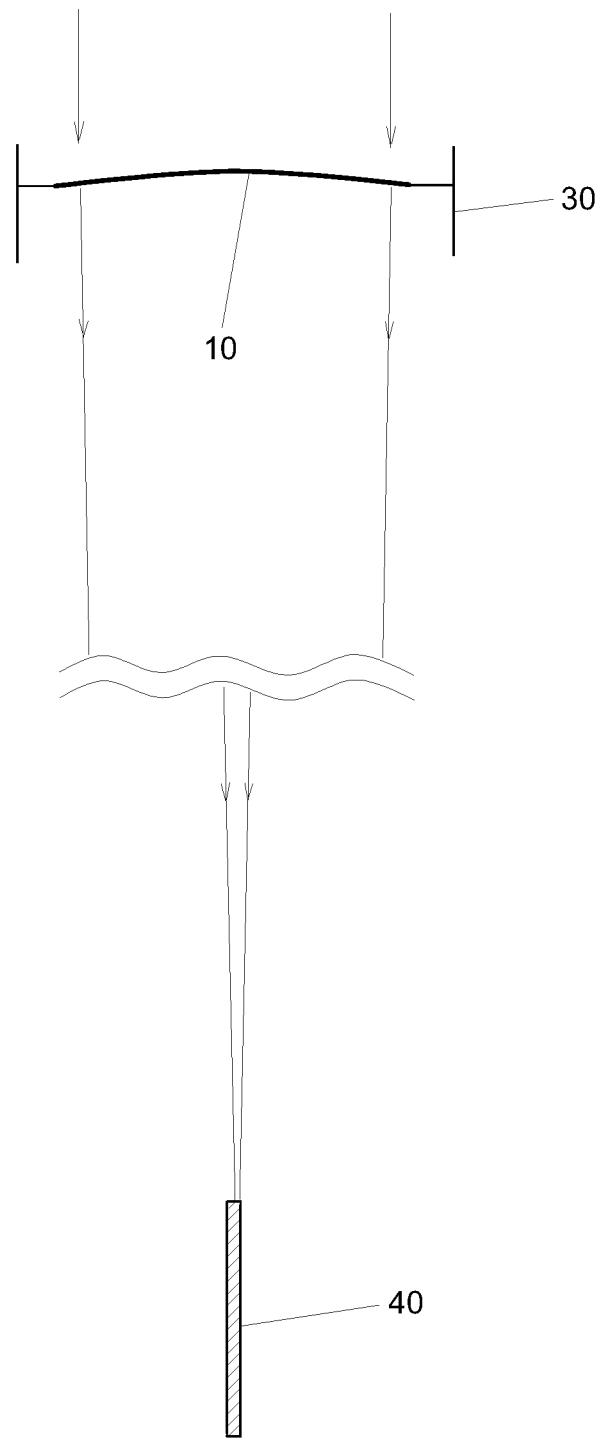
FIG. 1: Cross section schematic view: space telescope with fully tiled objective.

The present device (FIG. 1) utilizes a segmented all-reflective primary objective 10, with a rim 30, the objective being associated with a secondary focusing module 40. The primary objective (FIGS. 2A, 2B, 3) comprises many joined (fully tiled) reflective objective segments 20. The objective has a center which may be an open hole. The primary objective simulates a refractive Fresnel lens with localized segments and a long focal length compared with its diameter. Groups of objective segments can be pre-assembled for convenience. The objective may have a rim 30 containing ion thrusters and gyroscopic devices for positional control. The objective segment (FIGS. 4A-E) uses multiple reflection for nonfocusing transmissive beam steering. The objective segment (FIG. 4A cross section) comprises several objective segment elements, each element 21 consisting of a rigid straight bar having a v-shaped cross section. The element has two blades 25 joined at a vertex line segment 24, each blade 25 having optically flat mirrors 22 on both sides (functional surfaces), left open to the vacuum of space. The elements of a segment are separated and maintained with their vertex line segments arranged substantially in a plane and mutually parallel (FIG. 4A, 4D) by at least one rigid strut or spacer 23. Spacers can also serve as boundaries for joining an objective segment to an adjacent segment.

Figure 4A:
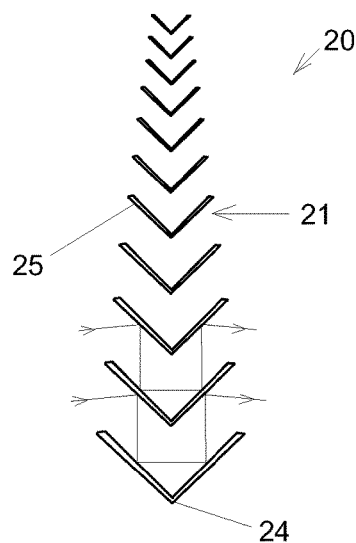
FIG. 4A: Cross section: objective segment.
Figure 4B:
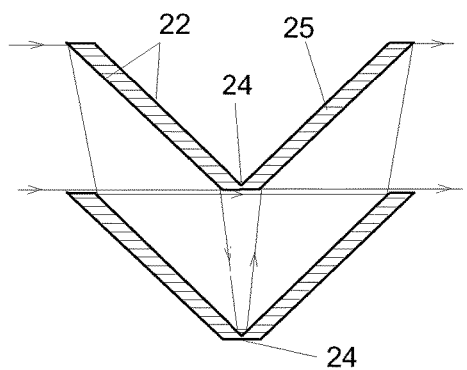
FIG. 4B: Cross section: objective segment elements with zero steering angle.
Figure 4C:
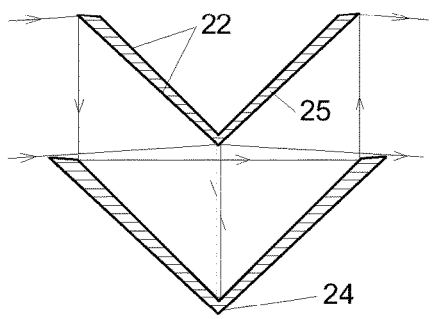
FIG. 4C: Cross section: objective segment elements with nonzero steering angle.
Figure 4D:
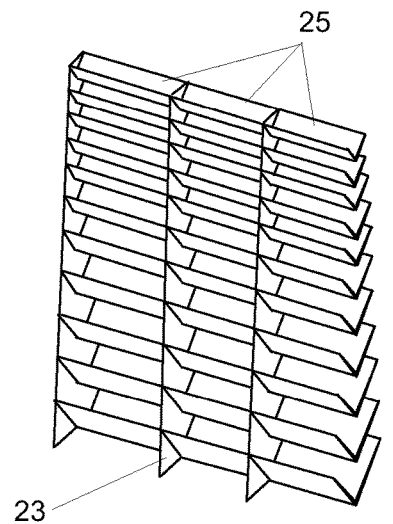
FIG. 4D: Oblique view: objective segment.
Figure 4E:
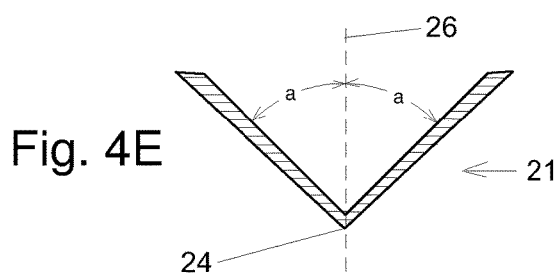
FIG. 4E: Cross section: segment element with plane of symmetry.

FIG. 4B shows a cross section of neighboring segment elements with ray traces, providing a small or negligible beam steering angle for segments near the objective's center. FIG. 4C shows elements giving a greater steering angle for segments nearer the objective's rim. FIG. 4D is an oblique view of a rectangular objective segment with elements and spacers. An incident light ray (FIG. 4A) is reflected once by an element's blade 25, then is reflected from both blades of its neighbor element back to the original element, then is reflected out the exit side. The ray is steered (deflected) in the objective segment's cross-sectional plane by a predetermined angle. The segment geometry is highly efficient. Nearly all of the incident beam is transmitted to the exit side. The objective's central "segment" can be an open hole since the incident beam travels straight through at this point.

Figure 3:
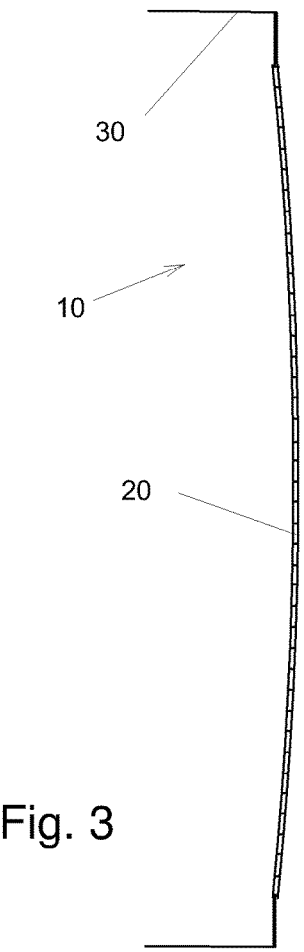
FIG. 3: Cross section view: fully tiled objective.

Each objective segment 20 serves to deflect or steer a portion of the incident plane wave or beam from a distant object to a convergence point on the objective's optical axis. The distance from the center of the objective to the convergence point will be called the objective focal length, even though the deflected segment beams do not actually focus to a final image at the convergence point. Every segment element's vertex line segment 24 must be substantially perpendicular to the line extending from the objective's center to the vertex line segment's midpoint, to ensure that the beam is steered to the convergence point. Employing a long objective focal length compared to objective diameter results in increased tolerance for error in segment location and angular orientation precision, reduces off-axis image aberrations in the final image, reduces the required mass of the objective, and reduces optical path length differences for the various segments. To provide increased mechanical stability, the objective segments may be arranged in a slight meniscus shape. The radius of curvature of the meniscus may be roughly twice the objective focal length, the convex side facing the distant object (FIG. 3). An alternative is a flat objective with its rim under a slight compression to maintain tension among the segments.

The optical path lengths for objective segment elements within each objective segment can be controlled by adjusting the size and separation of the segment elements relative to adjacent elements, giving a gradual decrease in blade width and element separation for elements nearer the objective's rim (FIG. 4A). In other terms, within each objective segment, the width of each blade joined at a vertex line is a decreasing function of the increasing length of the line from the objective center to the vertex line's midpoint. The plane of symmetry 26 for each segment element (FIG. 4E) is that plane which passes through the element's vertex line segment and bears the same angle a to the inner surfaces of both of the element's blades. The planes of symmetry of all the elements of each objective segment are made to substantially coincide. To prevent stray light reflection from spacers into the secondary focusing module, the spacers 23 should be confined to the incident side of the plane of symmetry of a segment, rather than the exiting side. As a result the spacers, and their stray light, are not visible from the viewpoint of the secondary focusing module.

Objective segment elements at the segment peripheries may have part of their surfaces made absorptive or reflective to prevent stray light from reaching elements of adjacent segments. Element blades should be of minimal width, from about 0.1 millimeter to 10 millimeters, for weight reduction. The ratio of blade widths between the widest and narrowest elements of each segment should be kept as low as possible, enabling the closest possible approach to a fully tiled objective. The objective segments and their elements may be molded or advanced high precision 3D printed, including their mirrors, from rigid lightweight materials such as polycarbonate, Kevlar®, titanium, carbon fiber, nanotubes, buckytubes, and graphene. The shape of objective segment boundaries should be chosen to minimize light loss at the boundaries and maximize the objective's effective tiling (coverage) ratio to as close to 1 as possible. For segments near the objective center the shape issue is not critical, but for segments nearer the rim it becomes important.

Figure 2A:
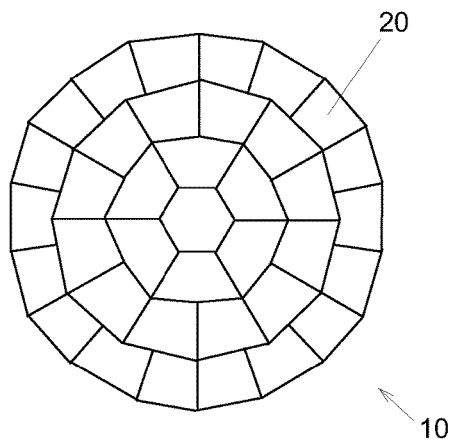
FIG. 2A: Axial (end or face) view: tiling of objective center.
Figure 2B:
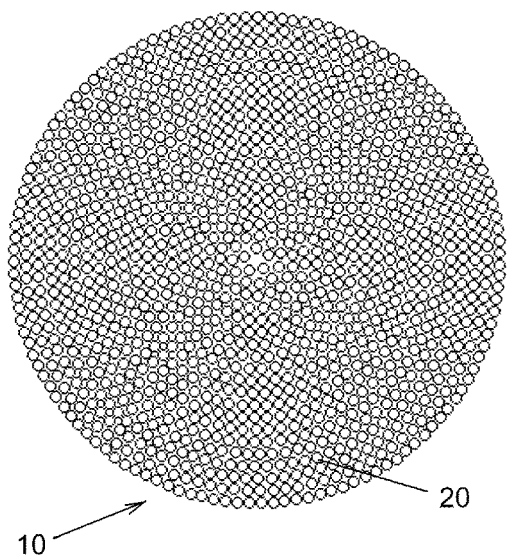
FIG. 2B: Axial view: objective with segment arrangement.

For this purpose, two of each objective segment's sides should be linear and parallel to the line extending from the objective center (FIG. 2A). The segment's other sides should be optimized to be as nearly parallel to its element vertex lines as possible. Each segment's shape should approximate a trapezoid. FIG. 2A shows an example layout of a central hexagonal hole and the first three rings of four and five sided segments. FIG. 2B shows a possible layout for a large number of segments.

Since the rate of change of total path length with distance from the objective center is much greater near the rim, leading to greater rate of change in element blade width, the outer objective segments may be made smaller to save weight.

Figure 5A:
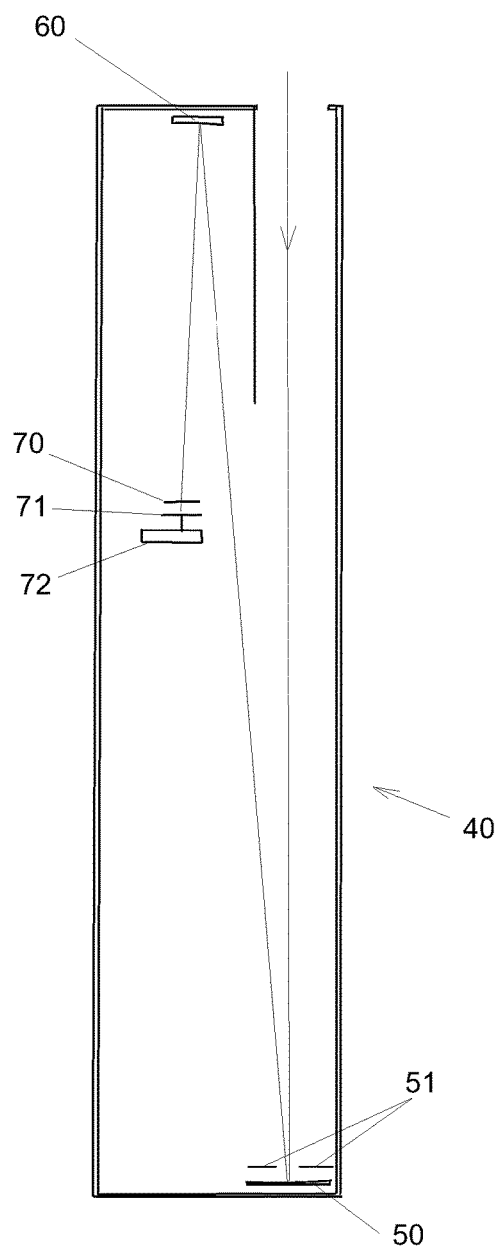
FIG. 5A: Cross section: secondary focusing module.

At the convergence point is located a secondary focusing mirror 50 (FIG. 5A) which is a component of a secondary focusing module 40. Also included in the secondary focusing module are an optional iris diaphragm 51, a fully tiled optical path corrector 60, a tunable bandpass filter 70, an image sensor 71, and an image processor 72. The objective 10 and the secondary focusing module 40 can be two independent spacecraft, independently controlled.

After exiting the objective segment the steered beam undergoes diffractive spreading. The beam width (diameter of the central beam including diffraction fringes) becomes approximately w=d k(r A/d), where d=diameter of objective segment, r=distance from objective traveled by beam, and A=wavelength, k is a quality factor; if greater than 1, more of the diffraction fringes outside the central beam are included.

Figure 5B:
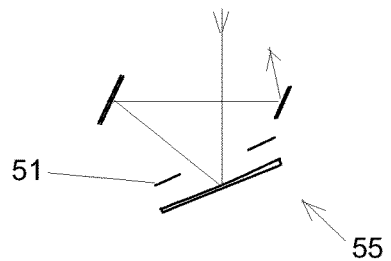
FIG. 5B: Cross section: anastigmat secondary focusing mirror.

The secondary focusing mirror 50 is located at or near the objective's convergence point. This mirror may be segmented or non-segmented. It may take the form of an unobstructed off-axis anastigmat 55 (FIG. 5B) with additional mirrors to reduce aberrations, with an iris diaphragm 51 located near the secondary mirror, to adjust the field of view of astronomical objects. By narrowing the iris diaphragm, a narrower field of view may be chosen to reduce noise and diffraction patterns from bright objects near the object of interest. The secondary focusing mirror focuses the objective beams into an image of the objective and its segments, this image being located at or near the optical path corrector 60.

It must be emphasized that the secondary mirror focuses on the objective segments, not the distant object. In other terms, the secondary mirror has its conjugates adjusted to project an image of the objective's segments onto the fully tiled optical path corrector 60. At the longest wavelength employed, the secondary focusing mirror 50 or 55 must be wide enough to resolve and separately image each objective segment at the optical path corrector, according to the above beam spread formula. The secondary mirror must also be wide enough to provide the desired field of view of astronomical objects.

Figure 6A:
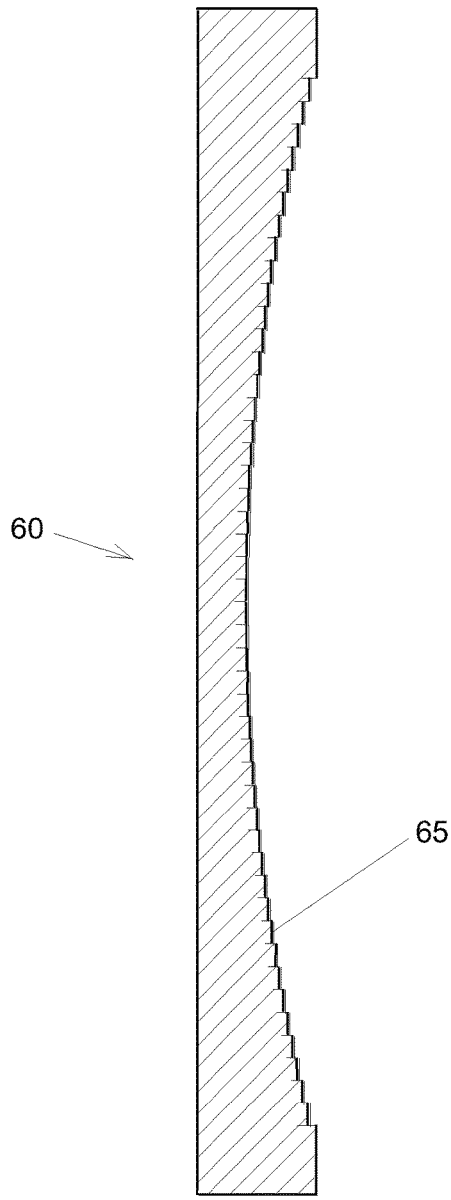
FIG. 6A: Cross section: optical path corrector.
Figure 6B:
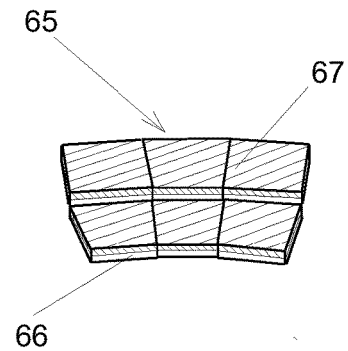
FIG. 6B: Oblique view: several optical path corrector segments.
Figure 6C:
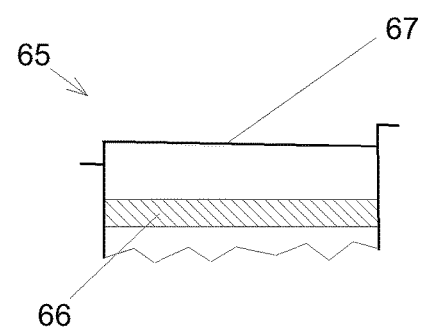
FIG. 6C: Cross section: optical path corrector segment.

The fully tiled optical path corrector 60 (FIGS. 6A-C) consists of mounted path corrector segments 65, each with a surface mirror 67. Each objective segment is paired with a dedicated path corrector segment, the corrector segment dedicated to processing the beams from its paired objective segment 20. The secondary mirror 50 or 55 focuses the beams (from all distant objects included in the field of view) from an objective segment onto the objective segment's paired corrector segment. For this reason, the path corrector's segments are arranged in the same geometric pattern as the objective segments. Each objective segment's beams, from whatever distant source, have a path length error specifically determined by the objective segment, which must be corrected by the paired path corrector segment. Each path corrector segment 65 has its axial depth, surface figure and angle of reflection adjusted to correct this path length error, and to focus and steer its beams toward the center of the image sensor 71 where they interfere with beams from other corrector segments to produce a final image. The focused beams create an approximation of a spherical wavefront centered at the image. The secondary mirror focuses beams from two neighboring distant point objects, passing through a given objective segment, onto the objective segment's dedicated corrector segment. The result, when taken over all of the corrector segments, creates two spherical wavefronts, each centered on a separate image point.

The axial position (longitudinal position or depth within the path corrector) of the corrector segment mirror 65 is adjusted to correct the optical path length error introduced by the fact that an objective segment 20 is of negligible thickness compared with the equivalent section of a conventional refractive objective lens. The position and depth of each corrector segment mirror is set so that the optical paths of the beams from all the objective segments are equally timed and in phase at the final image point to within the Rayleigh criterion. The path corrector segment's power focuses its beam, its axial location corrects the path errors of its objective segment, and its angular attitude is adjusted to steer the beam to the image sensor.

The difference in optical path between a beam at the objective's periphery and the beam at the objective's center is approximately h/8#, where h=objective diameter and # is the objective's f number. Since the reflected beam doubles back on itself, the optical corrector path corrector's dishing depth need be only half this, or h/16#.

Figure 5C:
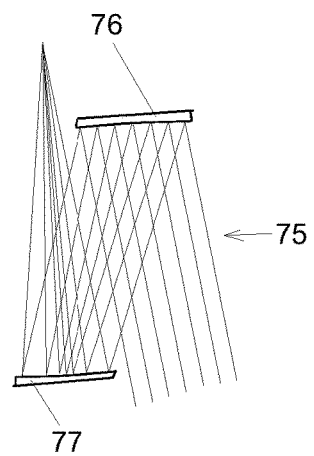
FIG. 5C: Cross section: apodizing optical path corrector.

Thus the optical path corrector has three basic functions, to correct beam path error caused by the objective, and to steer and focus each objective segment's beam towards the image sensor. A fourth (optional) function of the path corrector is to serve as a first apodizing mirror 76 (FIG. 5C) in an apodizing coronagraph for reducing glare from a bright source near a dim object of interest such as an exoplanet. In this variation, the apodizing path corrector assembly 75 consists of a first apodizing path corrector mirror 76 and an aspherical second apodizing mirror 77. The apodizing path corrector 76 is similar to the path corrector 60 but in addition serves to concentrate or "map" the objective segment beams nonlinearly toward the center of the second apodizing mirror 77. The effect of this coronagraphic method is to reduce diffraction fringes surrounding bright objects, which normally obscure images of dim objects.

In a fifth optional function, the optical path corrector 60 can have an active precision wavefront control device 66 (FIG. 6B, 6C) located behind each of its segments, to correct wavefront error to very small tolerances on the order of 1 nanometer, important when employing coronagraphic techniques. The wavefront control device can include a piezoelectric element.

If p is the fraction of light transmission of the objective due to its geometry (about 97 percent), then the total transmission coefficient for the telescope's entire optical train is given approximately by p(c^n), where c is the reflection coefficient for one mirror, and n is the number of mirrors in the optical train. For embodiment 1, the formula gives approximately 80 to 85 percent optical efficiency for visible light at the image sensor.

The symmetric arrangement of the objective segment 20 and elements 21 with their ray traces shown in FIGS. 4B and 4C leads to minimal changes in optical path length and beam deflection resulting from small changes in the segments angular attitude. For this reason all objective segments should be angularly positioned within the objective, related in this way to the incident and exiting beams according to this symmetry principle.

The space telescope can be assembled robotically at location, each objective segment or segment group joined to neighboring segments or groups by locking attachment, by laser welding or similar process.

Second Embodiment: Large Aperture Sparse Objective Telescope

Figure 7:
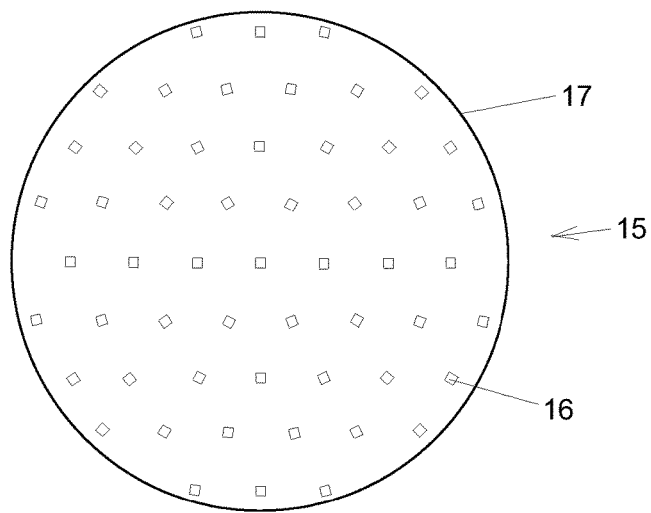
FIG. 7: Axial view: sparse objective.
Figure 8:
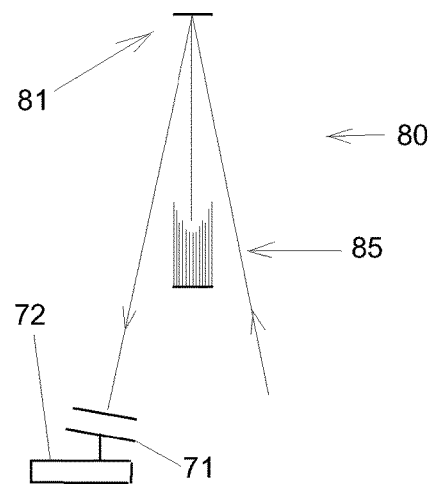
FIG. 8: Cross section: sparse optical path corrector.

This embodiment is different from the first embodiment in two ways. Instead of being fully tiled, the sparse objective 15 (FIG. 7 schematic axial view) is composed of sparsely distributed objective segments 16, kept in position by taut cables or struts, attached to a rim 17 under slight compression. Alternatively, each objective segment can be an independent spacecraft with thruster and gyro positioning controls. The second variation from the first embodiment is a different construction of the optical path length corrector, called the sparse optical path length corrector 80. The path corrector can accommodate much greater path length differences than can the single-unit path corrector of the first embodiment. The sparse path corrector has two basic components, the input-output corrector plate 81 and the path length corrector plate 85 (FIG. 8, 9).

Figure 9:
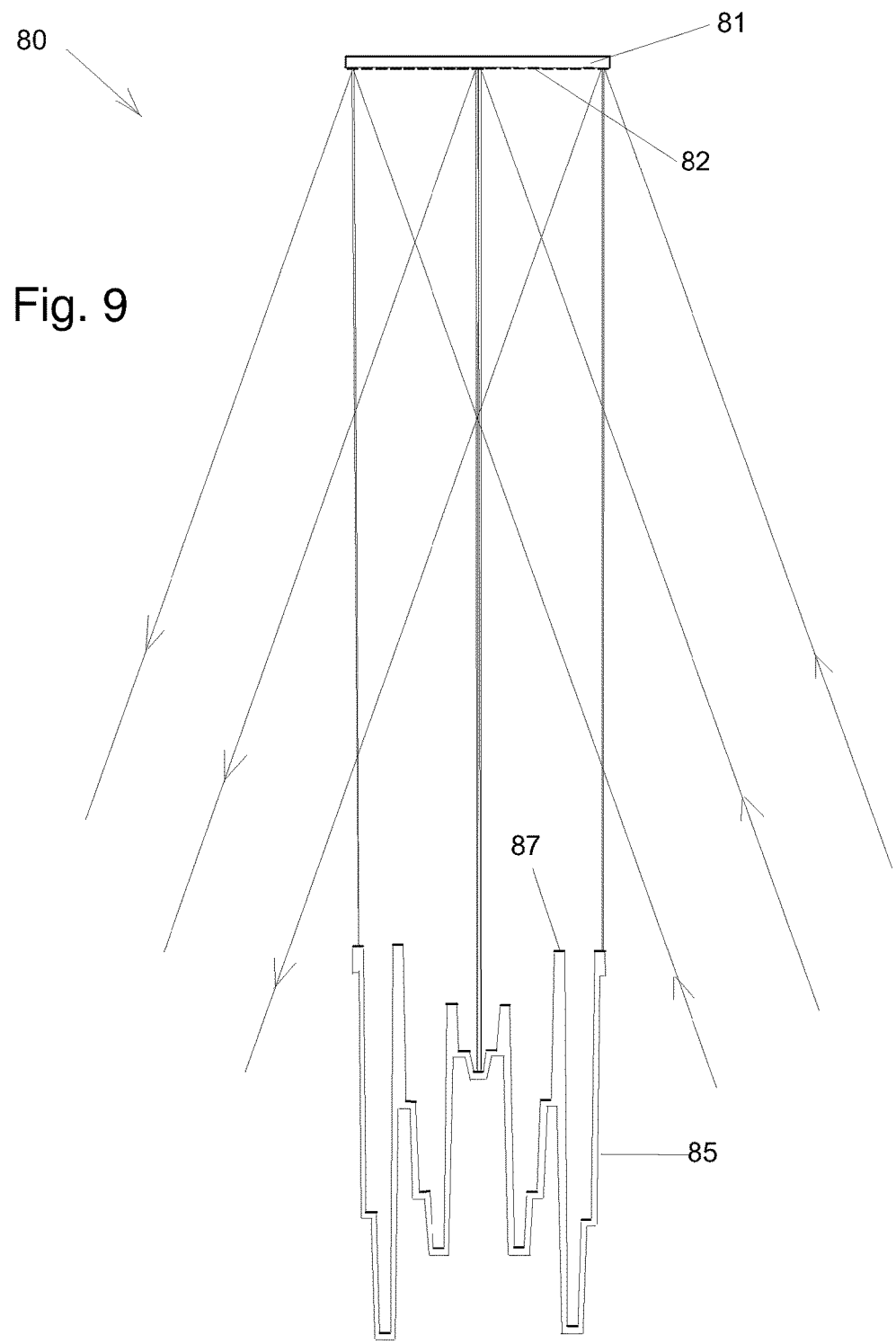
FIG. 9: Detailed cross section view: sparse optical path corrector.

On the surface of the input-output plate are arranged mirror groups, each mirror group 82 dedicated to processing one objective segment beam (FIG. 9, 10C face view). A mirror group consists of several collimating beam steering mirrors 83.

Figure 10A:
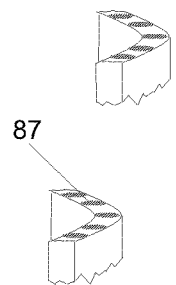
FIG. 10A: Oblique view: three tiers of sparse path length corrector plate.
Figure 10A:

The path length corrector plate 85 is similar to the input-output plate except that it is terraced for compensating large path length differences of the various objective segment beams. The path length corrector plate, like the input-output plate, has mirror groups (FIG. 10A), each mirror group 87 including several collimating beam steering mirrors 88. Each mirror group 87 of the path length corrector plate 85 corresponds to (is paired with) a mirror group 82 of the input-output plate; each pair of mirror groups being dedicated to processing a single objective segment's beam. Since the objective segments are sparse, there exists more than adequate area on both corrector plates for the arrangement of the mirror groups.

Figure 10B:
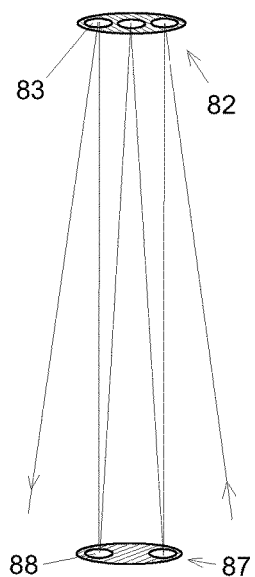
FIG. 10B: Oblique view: beam reflections in sparse optical path corrector.
Figure 10C:
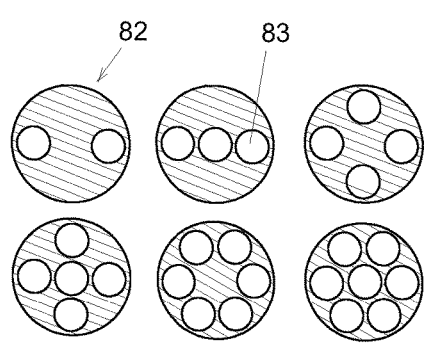
FIG. 10C: Axial view: mirror groups having various numbers of beam steering mirrors. 10D: Axial view: sparse input output path corrector plate.
Figure 10D:
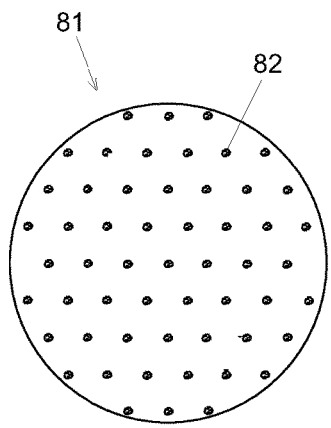
FIG. 10E: Axial view: apodizing sparse input output path corrector plate.

Within each pair of mirror groups, the beam is reflected back and forth until the desired path length correction is attained (FIG. 10B schematic oblique view). The beam steering mirrors are figured to function as collimating relays to maintain the narrowness of the beam throughout the multiple reflections it undergoes before it reaches the final output mirror on the input-output plate. To limit the dimensions of the sparse path corrector to a reasonable size, the number of reflections for a given mirror group pair can be made greater for central objective segment beams than for beams from nearer the objective rim, requiring more beam steering mirrors in both groups of a central mirror group pair. The terraced structure of the path corrector plate arises from the change of mirror number from one mirror group pair to nearby pairs. FIG. 10C (face view) shows mirror groups having various numbers of beam steering collimating mirrors. To enable better collimation of the beams, the secondary focusing mirror may be adjusted to slightly defocus the beams at the input output plate. In other terms, the images of the objective segments are focused slightly in front of or beyond the input output plate.

The arrangement pattern of the objective segments 16 (FIG. 7) affects diffraction patterns in the final image. Most of the energy from an observed point source goes into the image's Airy disk and its immediate surrounding fringes. However, with a less than fully tiled objective, a certain fraction of the energy is directed into diffraction noise in other areas of the image. The objective segment arrangement can be chosen to reduce noise. A more organized segment pattern, for example FIG. 2B where the segments are arranged in concentric rings, each ring having a number of segments equaling a prime number, will result in concentrating much of the diffraction noise into circular haloes centered on bright objects. In another example, the segment pattern (FIG. 7), if less than fully tiled, concentrates the noise into straight lines a specific distance from bright image points, depending on wavelength. These haloes are positioned depending on wavelength; a tunable bandpass filter 70 (FIG. 5A) may be used in front of the image sensor 71 to greatly narrow the halo width. The image processor 72 can work in combination with the bandpass filter to reduce diffraction noise. Each light wavelength produces a different noise pattern in the image. The processor can be designed to recognize components of the image that are varying with wavelength in this way and use algorithms to reduce them.

Figure 10E:
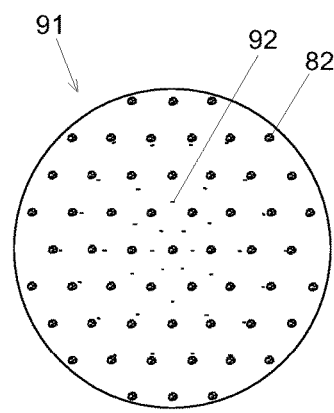

The sparse optical path corrector can be made an apodizing corrector. A separate second apodizing mirror is not required. The final reflecting mirror in a mirror group of the path corrector plate steers and maps the beam nonlinearly towards an output mirror 92 (FIG. 10E) located nearer the center of an apodizing input-output plate 91. From this mirror the beam is focused and steered toward the image sensor.

As a calculation of the maximum tolerance for sparse segment positioning error, the change in path length error dp for a given small change df in axial position of an objective segment near the rim is approximately $dp=df/(8 \#^2)$. To keep dp below the Rayleigh limit for an objective of f number #=50, the position error tolerance is on the order of one centimeter, maintained with laser rangefinding techniques.

Third Embodiment: Large Aperture Two Stage Telescope

Figure 11:
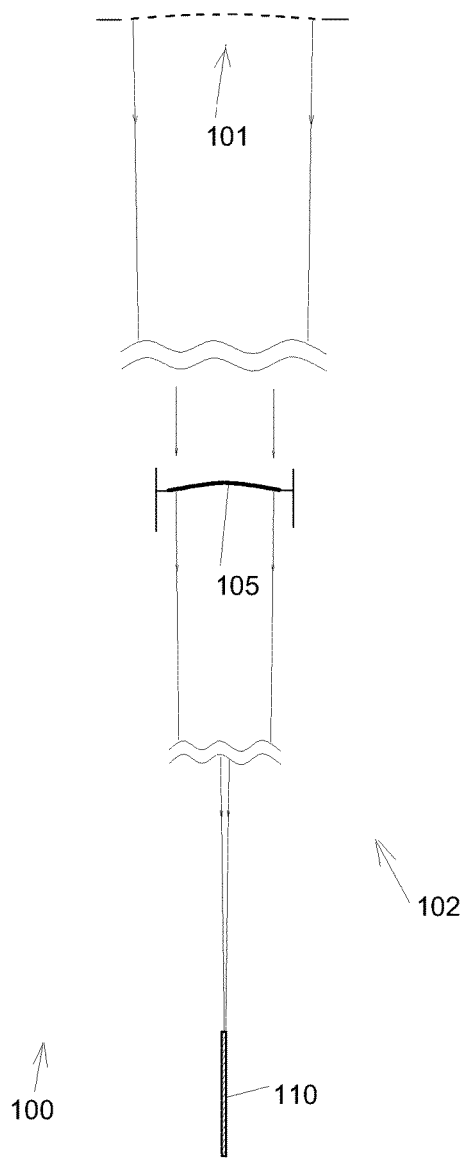
FIG. 11: Schematic cross section: two stage space telescope.

The third embodiment is a two stage telescope 100, (FIG. 11 schematic) combining the first and second embodiments. This embodiment allows the primary objective's aperture to be scaled up to far greater apertures without a large increase in mass. The primary objective 101 is a sparse segmented objective similar to that of the second embodiment. The objective segments can be linked with thin fibers, such as carbon fibers, to maintain relative positioning, with a rim under compression at the objective's periphery to provide the overall slight tensioning required. Alternatively each segment can be an independent spacecraft. As solar wind and tidal forces may be problems, this telescope may need to be located further from the Sun than the Earth's orbit.

Figure 12:
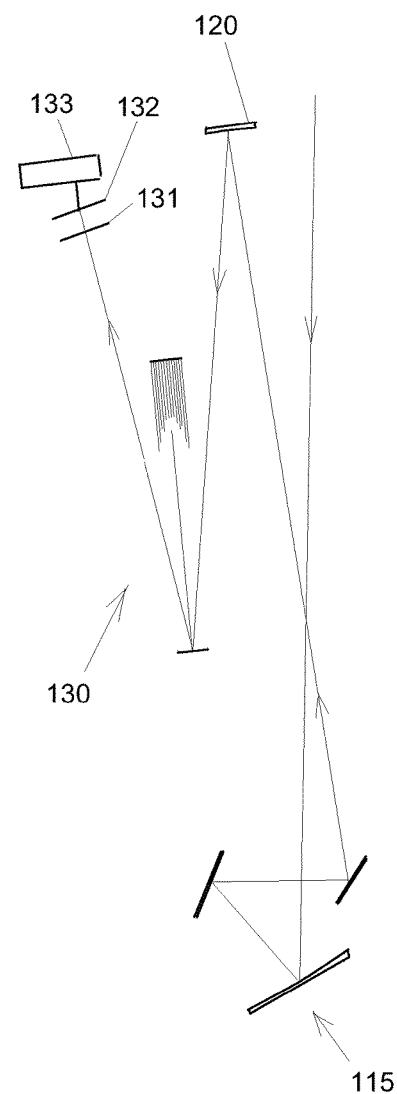
FIG. 12: Cross section: two stage secondary focusing module.

The sparse segmented primary objective 101 (FIG. 11) steers beams to a secondary telescope 102 which in most respects is similar to the telescope of the first embodiment discussed above. The secondary telescope consists of a fully tiled relay objective 105 (embodiment 1), a two stage secondary focusing module 110 (FIG. 12) which includes a secondary focusing mirror 115 with optional iris, a fully tiled (embodiment 1) optical path corrector 120, a sparse (embodiment 2) optical path corrector 130, an optional tunable bandpass filter 131, image sensor 132, and image processor 133. The function of the first three components of the secondary telescope (105, 115, 120) is to project images of the segments of the sparse primary objective 101 onto the sparse optical path corrector 130 which is similar to the sparse path corrector of the second embodiment. The fully tiled path corrector corrects the path error of the relay objective, and the sparse path corrector corrects the much larger path errors caused by the sparse primary objective. As in the first and second embodiments, the two stage telescope may be apodizing (FIG. 13). In this case, either or both of the optical path correctors 140 and 141 are apodizing.

Fourth Embodiment: Large Aperture Retro Reflecting Two Stage Telescope

Figure 15A:
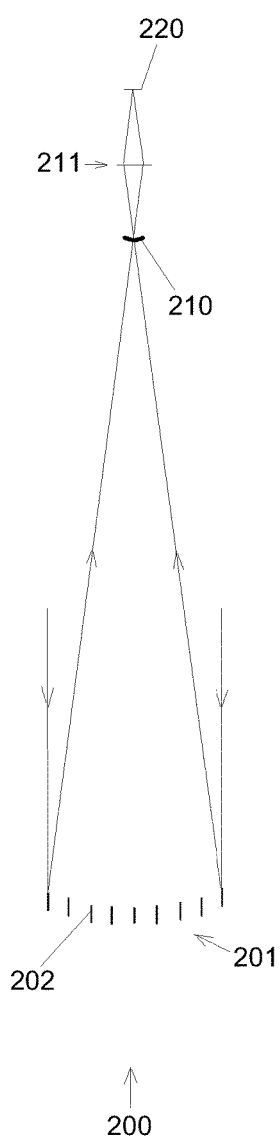
FIG. 15A: Schematic cross section: retro reflective flotilla telescope.
Figure 15B:
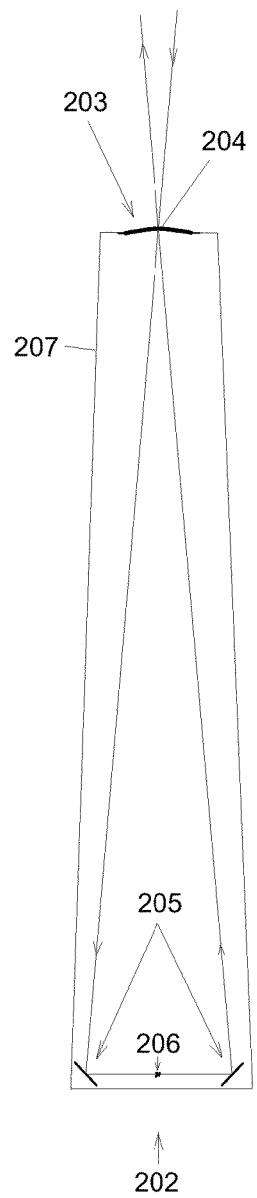
FIG. 15B: Schematic cross section: retro reflective primary objective segment.

This embodiment is a two stage telescope (FIG. 15A-C) for very large apertures, eliminating the primary objective's large path error problem. It enables the primary objective's f number to be reduced, to some extent alleviating the beam spread problem due to distance, but aperture is still ultimately limited by beam spread. The telescope 200 (FIG. 15A) has the following modifications. The sparse primary objective 201 consists of a flotilla of retro reflectors 202, each having a high f-number, with a modest sized aperture on the order of 10 meters. The retro reflectors simulate plane mirror segments in a sparse Newtonian design. Each retro reflector 202 (FIG. 15B) includes a fully tiled objective segment group 203 of the embodiment 1 type with convergence point 206, the group having component segments 204. The retro reflector is provided with two small plane mirrors 205, near the axis of symmetry, which combine to reflect incident segment beams back out the front of the objective, deflected by an angle predetermined to steer the exiting beam backwards to the primary objective's convergence point. A sparse path corrector for large path errors is not required. The path errors between segments within each retro reflector are small and can be controlled by adjusting the size and spacing of each segment's comprised elements.

Figure 15C:
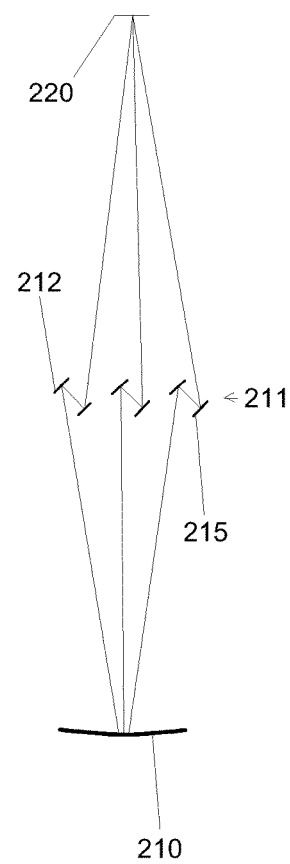
FIG. 15C: Schematic cross section: relay, secondary focuser, corrector, image sensor.

To greatly reduce path differences, the primary's retro-reflectors 202 are arranged along a parabolic surface with its focus located at a fully tiled relay objective 210 of the embodiment 3 type. Viewed as a whole, the primary objective flotilla may have a low f-number of about 10, for reducing the effect of beam spread over large distances. The beams reflected from the retro reflectors are aimed at a convergence point at which a fully tiled relay objective 210 (of embodiment 1 type) having a large f number is located (FIG. 15C). Since the primary objective flotilla's f number is small, the relay's convergence points will be widely distributed. Thus a single secondary focusing mirror is not feasible in this embodiment. A group of small separate secondary focusing mirrors 212 is therefore located at the relay's convergence plane 211, each secondary mirror receiving one retro reflector's beam.

Paired with each secondary focusing mirror 212 is a fully tiled optical path corrector 215 (embodiment 1), which corrects the modest path errors introduced by the relay objective and steers the beam towards the image sensor 220. The path corrector segments can include active precision wavefront control devices.

Each independent retro reflector is small enough for its components to be linked with struts into a single unit, enabling a lightweight enclosure 207 to be included. Aiming can thus be accomplished with gyroscopic devices alone, saving substantially on thruster fuel.

The two stage retro reflective telescope may be apodizing. In this case the relative positioning of the secondary focusing mirrors and the path corrector mirrors may be adjusted (not shown) to concentrate and map the peripheral beams toward the center of the focused light cone converging on the image sensor.

A basic requirement of this embodiment is precise measurement and control of the distances between the primary's retro reflectors and the relay objective, secondary focusing mirror and path corrector, to a precision of 100 nanometers or better. For this purpose, laser rangefinders emitting pulses of duration $10^{-15}$ second or less can be implemented, in combination with ion thrusters.

The main limiting factor for this design is tidal force caused by the Sun. As a consequence, the telescope must be located a minimum distance from the Sun to avoid unacceptable levels of relative acceleration between the various telescope components. Fortunately the tidal influence decreases as the inverse cube of the distance, but even with this fact the telescope may need to be located 100 astronomical units or more from the Sun.

As an alternative to coronagraphs, occluders such as the Cash petal occluder disk as an independent spacecraft (not shown) may be used in combination with the present device to block light from a bright source near dim objects.

Fifth Embodiment: Telescope Flotilla for Intensity Interferometry

At the most extreme apertures of hundreds of thousands or millions of kilometers, the Hanbury Brown & Twiss intensity interferometry method comes into its own. To avoid the path difference and component positioning problems that can occur with very large apertures, the intensity interferometry technique may be employed instead of amplitude-phase imaging. Another advantage is that the beam spread problem does not arise in this embodiment.

This embodiment employs a flotilla of independent beam steering telescopes of the embodiment 1 type. It is possible to overcome limitations on effective aperture size by employing a sparse aperture-synthesized flotilla of independent telescopes numbering on the order of 100. Each flotilla telescope (FIG. 14) is of a relatively modest size, with fully tiled objective 10 about 10 meter aperture, 200 meter focal length, with objective segments about 3 to 10 cm diameter. The secondary focusing mirror 55 and the optical path corrector 75, about 30 cm diameter.

Each independent flotilla telescope forms an image by amplitude-phase interferometry, optionally aided by coronagraphic methods such as apodization. The image processor then measures real time intensities of one or more pixels of the image, and transmits the intensity information in a modulated laser beam to the central computer, where the information from the entire flotilla of independent telescopes is combined.

Each independent telescope is small enough for its objective and secondary focusing module to be linked with struts into a single unit, enabling a thin shroud baffle to be included to block unwanted light in the same way as a common telescope tube. Aiming can be accomplished with gyroscopic devices alone, saving substantially on thruster fuel. The assembly can likely be kept under 500 kilograms, with total mass of the flotilla about 50 to 100 metric tons. Effective apertures of $10^6$ km or more may be implemented with this system.

A photon counting device such as a Cherenkov detector is placed at each pixel of the image sensor 71. The real time intensity information generated by all pixels is gathered and used by the image processor 72 to modulate a laser beam which is transmitted to a central computer processor located in a central spacecraft (not shown). To avoid large path errors, the flotilla's craft are located along a parabolic surface with its focus at the central craft.

In each independent telescope, the modulated laser source beam is widened and collimated to a parallel beam directed at the central computer craft, essentially by employing the telescope in reverse mode as a laser beam projector. The "point source" conic modulated laser beam is sent from a source 73 in the image plane near the image sensor 71. It then reflects from the optical path corrector 75, then from the secondary focusing mirror 55 and out the objective 10 in a parallel beam steered to the central computer craft. The laser source 73 should be mounted on a positioning device for controlling its location within a micrometer or less, as a way of aiming the laser beam precisely at the central craft. To prevent reflections of the laser signal from interfering with the incident image forming light, a laser wavelength may be chosen which is outside the wavelength band being observed, and a monochromatic blocking filter may be placed over the image sensor.

When the laser beams from the flotilla arrive at the central craft, a fully tiled relay objective (not shown) steers the beams to one or more secondary focusing mirrors which focus the beams to separate point images, one for each beam. An optical path corrector for the sparse primary flotilla is not required. Spread of the laser beams due to large transmission distances is not a serious problem. The secondary focusing mirrors need only collect a very small proportion of the laser beam's power to extract their information content. The intensity information from all of the flotilla's telescopes is then combined by the computer using algorithms to produce a final image.

Although the description above contains many specificities, these should not be construed as limiting the scope of the embodiments but merely illustrating some of several embodiments.

What is claimed is:

1. A space telescope,
    (a) the space telescope comprising a primary objective, said primary objective having a center, the space telescope comprising at least one image sensor;
    (b) said primary objective comprising a plurality of objective segments, whereby each objective segment redirects an incident light beam to a steered light beam aimed at a convergence point on an optical axis of the primary objective;
    (c) each objective segment comprising a plurality of objective segment elements, each objective segment element being a straight bar having a v-shaped cross section, each objective segment element comprising a first blade and a second blade, the first blade and the second blade being joined at a vertex line segment, each blade having optically flat mirror surfaces on both sides, each objective segment element having a plane of symmetry passing through its vertex line segment, said plane of symmetry bearing the same angle to the first blade and to the second blade, the incident light beam and the steered light beam bearing substantially the same angle to the plane of symmetry, an incident light ray reflecting from a first blade of a first segment element, then from a first blade of a second segment element adjacent to the first segment element, then from a second blade of the second segment element, then from a second blade of the first segment element, whereby the light ray is directed to a separate component of the telescope such as a secondary mirror or a relay objective;
    (d) each objective segment having
        (1) all of its vertex line segments substantially mutually parallel and in a plane,
        (2) all of its vertex line segments substantially perpendicular to a line extending from the center of the objective to each vertex line segment's midpoint,
        (3) the planes of symmetry of its objective segment elements substantially coinciding;
    (e) each objective segment comprising at least one spacer for positioning of objective segment elements.

2. The space telescope of claim 1, further comprising
    (a) at least one secondary focusing mirror, for producing images of the objective segments;
    (b) at least one optical path corrector, for correcting optical path error and focusing light beams from each objective segment to the at least one image sensor,
        the at least one optical path corrector comprising a plurality of path corrector segments, each path corrector segment having a mirror,
        each objective segment being paired with one path corrector segment, each path corrector segment being paired with one objective segment,
        the at least one secondary focusing mirror focusing an image of each objective segment onto the objective segment's paired path corrector segment exclusively.

3. The space telescope of claim 2, further comprising an iris diaphragm proximal the secondary focusing mirror.

4. The space telescope of claim 2, further comprising a tunable bandpass filter.

5. The space telescope of claim 2, wherein the optical path corrector is an apodizing optical path corrector, for coronagraphic methods.

6. The space telescope of claim 2, further comprising an active precision wavefront control device, for positioning path corrector segments.

7. The space telescope of claim 2, wherein the secondary focusing mirror is an unobstructed anastigmat.

8. The space telescope of claim 2, further comprising
    (a) at least one photon counter;
    (b) at least one laser source proximal the at least one image sensor, for steering a laser beam backwards through the objective to a central craft, for intensity interferometry.

9. The space telescope of claim 2, wherein the objective segments are sparsely distributed and wherein the optical path corrector is a sparse optical path corrector.

10. The space telescope of claim 9, further comprising
    (a) a fully tiled relay objective;
    (b) a fully tiled optical path corrector.

11. The space telescope of claim 10, wherein the secondary focusing mirror is an unobstructed anastigmat having at least two mirrors.

12. The space telescope of claim 1, wherein the primary objective further comprises at least two plane mirrors, for reflecting light beams backwards to the at least one image sensor.

13. The space telescope of claim 12, further comprising a fully tiled relay objective.

14. The space telescope of claim 1, further comprising a Cash occluder, for blocking light rays from bright sources, for improved imaging of nearby dim sources.

* * * * *

UNITED STATES PATENT AND TRADEMARK OFFICE
CERTIFICATE OF CORRECTION

PATENT NO. : 10,338,371 B1
APPLICATION NO. : 16/024631
DATED : July 2, 2019
INVENTOR(S) : Glenn Arthur Morrison It is certified that error appears in the above-identified patent and that said Letters Patent is hereby corrected as shown below:

In the Specification

Column 3, Line 5, change '108' to --10B--.

Column 5, Line 22, change 'w = d k(r A/d)' to --w = d + k(r $\lambda$ /d)--.

Column 5, Line 24, change 'A' to --$\lambda$--.

Signed and Sealed this
Third Day of September, 2019

Andrei Iancu
*Director of the United States Patent and Trademark Office*